INVENTOR.
LAWRENCE W. WATERS
BY
Mellin and Hanscom
ATTORNEYS

May 31, 1960 L. W. WATERS 2,938,620
PEACH ORIENTING MACHINE
Filed Nov. 18, 1957 8 Sheets-Sheet 4

INVENTOR.
LAWRENCE W. WATERS
BY
Mellin and Hanscom
ATTORNEYS

May 31, 1960  L. W. WATERS  2,938,620
PEACH ORIENTING MACHINE
Filed Nov. 18, 1957  8 Sheets-Sheet 5

INVENTOR.
LAWRENCE W. WATERS
BY
Mellin and Hanscom
ATTORNEYS

United States Patent Office 2,938,620
Patented May 31, 1960

2,938,620

PEACH ORIENTING MACHINE

Lawrence W. Waters, Fullerton, Calif., assignor to United Can and Glass Company, Hayward, Calif., a corporation of Delaware Filed Nov. 18, 1957, Ser. No. 697,045

18 Claims. (Cl. 198—33)

This invention relates to improvements in peach orienting machines, and more specifically to orienting machines in which a peach is placed loosely in a peach holding device and is rotated to oriented position within said holding device by a rotating rod in frictional engagement with the peach.

One of the major problems in the automatic machine handling of peaches in canning operations is the requirement that the peaches be properly oriented before they are fed to a pitting machine; it being a necessity of peach pitting machines that the peaches be placed therein so that the vertical axis and the suture plane of the peaches are oriented with respect to the pitting mechanism. It has been proposed to orient the peaches, before they are fed to the pitting machine, by placing them into holding cups where they are then rotated or jiggled by some form of rotating shaft until the peach finally straddles the shaft with the dimpled stem end over the shaft and with the suture plane of the peach being aligned with the shaft. These orienters have not met with practical success because the peaches must be held by the cups so that the center of the peach is vertically above the orienting shaft and also so that there is sufficient clearance between the peach and the cups to permit the peach to roll freely within the cup to its oriented position. If there is too much clearance between the peach and the cups, the peach will roll off the orienting shaft and will not become oriented. If there is too little clearance, the free rotation of the peach will be prevented, again resulting in a failure of the peach to orient. Attempts have been made to use these machines by carefully grading the fruit so that it will fit properly within the cups, but this has proven to be an impractical approach to the problem as it is too costly and time consuming.

Applicant has devised an orienting machine of the general character described above which holds the peaches by holding fingers above an orienting shaft and which provides the desired clearance between the holding fingers and the peach held thereby, regardless of the size of the peaches. Applicant accomplishes this by placing any size peach in the holding fingers, and then allowing the fingers to close completely onto the peach. After this closing movement, the fingers are then reopened a fixed predetermined amount so that the proper clearance is obtained between the holding fingers and the peach. This amount of reopening of the fingers from the fully closed position is the same, regardless of how far the fingers have had to close into full contact with the particular peach held thereby, and thus the spacing between the fingers and the particular peach held thereby will be constant, regardless of the relative size of the particular peach. In this manner, the peaches are held in proper position to be oriented without any costly grading of the peaches as to size.

It is a primary object of the invention to provide a peach orienting machine with a peach holding device having fingers to support a peach above an orienting shaft, and in which the fingers are first closed completely onto a peach held thereby, and are then reopened a fixed predetermined amount to provide the proper clearance between the fingers and the peach.

It is a further object to provide a peach orienting machine capable of being driven from and in synchronism with a pitting machine so that an oriented peach is fed to the pitting machine for each cycle of operation of the latter.

Another object is to provide an orienting machine with transfer means to transfer oriented peaches to a pitting machine, and in which the transfer means is rendered inoperative in case a peach to be transferred has not been properly oriented.

Yet another object is to provide an orienting machine having a frictional orienting shaft with drive means for said shaft to simultaneously rotate and reciprocate said shaft to induce a double rotative movement to the fruit engaged thereby.

A further object of the invention is to provide a peach orienting machine having an endless chain carrying a plurality of peach holding devices, which is easily adapted to be made in different lengths to utilize the optimum floor space available in a particular plant.

Yet another object of the invention is to provide a peach orienting machine comprising an endless chain, a peach holding device mounted on said chain for movement therewith, said holding device having a plurality of holding fingers adapted to encircle a peach, means to open said fingers, means to feed a peach into said holding device, means to close said fingers onto said peach, means to reopen said fingers a predetermined distance from said peach, a rotatable rod frictionally engageable with the bottom of said peach to orient said peach while said fingers are spaced said predetermined distance from said peach, means to close said fingers onto said peach after the orientation thereof, transfer means to grip said peach while the peach is held by said closed fingers, and means to open said fingers after said transfer means has gripped said peach whereby said peach may be removed from said holding device.

Other objects and advantages will become apparent in the course of the following detailed description.

In the drawings, forming a part of this application, and in which like parts are designated by like reference numerals throughout the same.

Fig. 11 is a sectional view taken on line 11—11 of

Fig. 10, with parts shown in plan and with the peach holding fingers removed to show other details.

In general, the peach orienter comprises an endless moving chain which carries a plurality of peach holding devices thereon. Each of the peach holding devices is adapted to straddle a rotating and reciprocating frictionally surfaced orienting shaft as the holding devices progress with the moving chain. Further, each of the holding devices has mounted thereon a plurality of holding fingers which are adapted to encircle and hold a peach vertically above the orienting shaft. The machine includes means to open the holding fingers so that a peach may be placed into the holding devices from a feeding station. After a peach is placed into a holding device, the fingers are closed completely onto the peach. Then the fingers are reopened a predetermined distance to hold the peach loosely above the orienting shaft so that the peach may rotate to an oriented position while preventing the peach from rolling off of the orienting shaft.

As each holding device comes to the end of the upper flight of the endless chain, the fingers are again closed to grip the now oriented peach, and a transfer device then also grips the peach to remove it from the holding device, the holding fingers being reopened to permit such removal. In addition, means are provided to deactuate the transfer device in case a peach has not become oriented, so that a non-oriented peach will not be transferred to a pitting machine.

Figure 1:
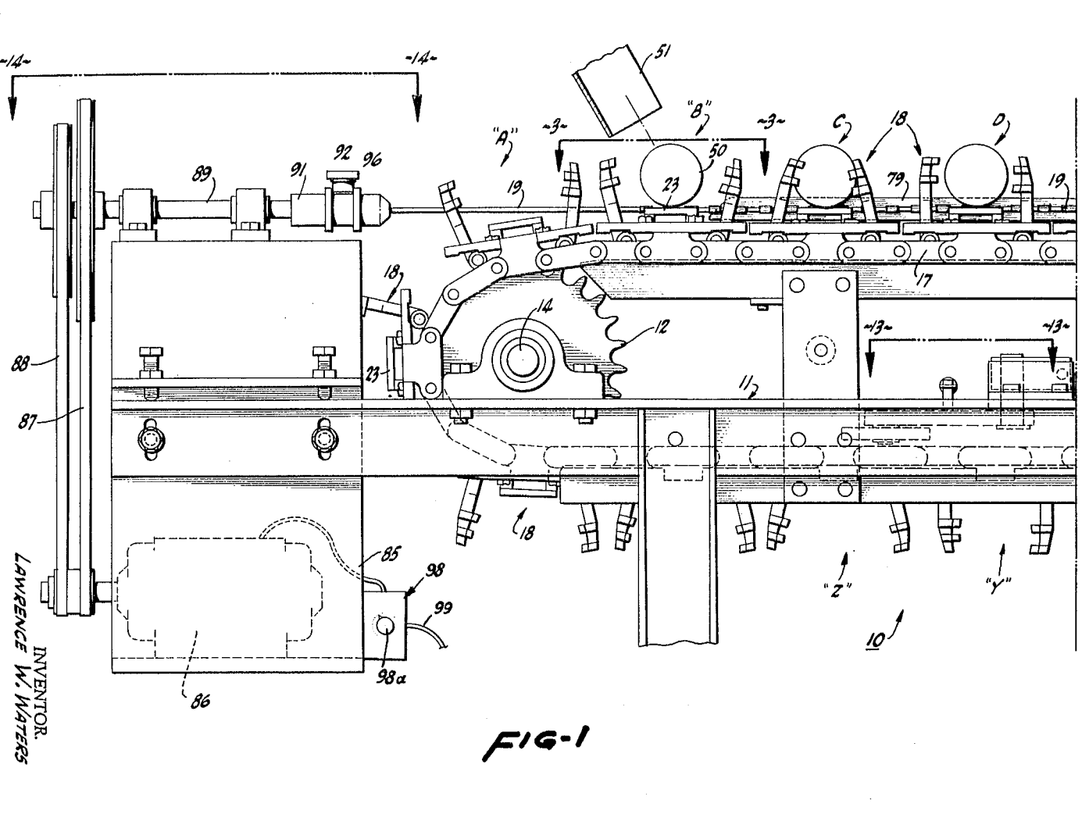
Fig. 1 is a side elevational view of the front part of a machine embodying the principles of this invention.
Figure 2:
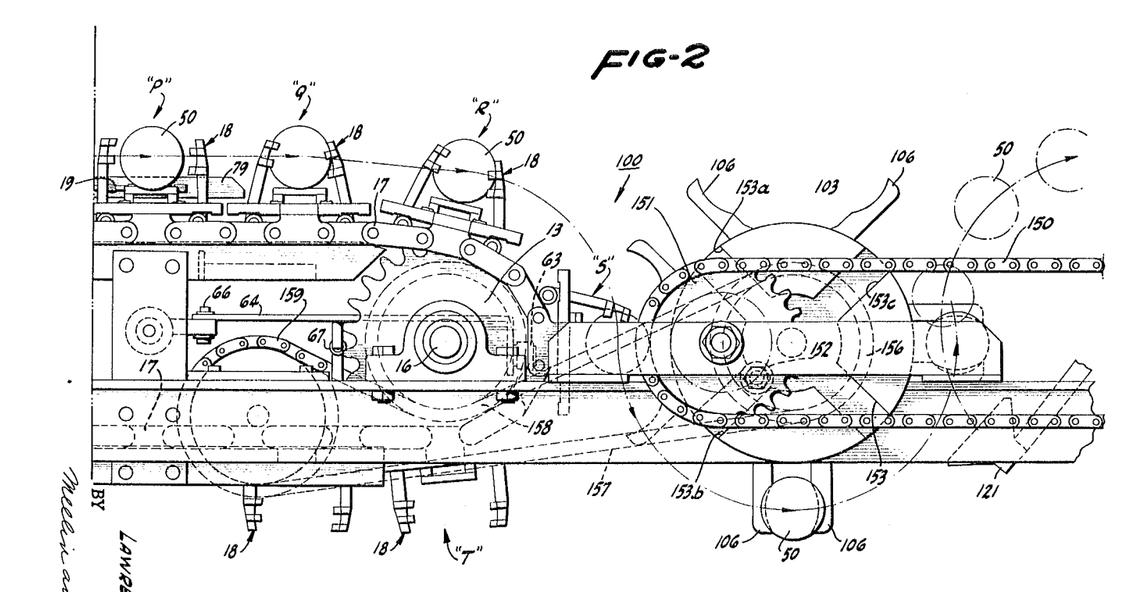
Fig. 2 is a side elevation of the back part of the machine of Fig. 1, and is a continuation of Fig. 1.

Referring now to the drawings, and to Figs. 1 and 2 thereof, the orienting machine 10 comprises a frame 11, mounted on a suitable base (not shown). Sprockets 12 and 13, mounted on shafts 14 and 16 rotatably journaled on the frame 11, engage an endless chain 17 having its upper flight movable from left to right in these drawings. Mounted on chain 17 at spaced intervals therealong are a plurality of identical peach holding devices, each indicated generally by the reference numeral 18. As these holding devices 18 move with the upper flight of chain 17, they straddle a rotating and reciprocating orienting shaft 19, in a manner to be hereinafter described.

The peach holding devices 18, shown most clearly in Figs. 3 through 9, comprise a base plate member 21 affixed at the sides thereof to inwardly extending ears 22 on chain 17. An open topped channel member 23 is centrally mounted on the base plate and extends longitudinally of the machine to encompass the orienting shaft 19 such that the upper surface of the orienting shaft protrudes upwardly therefrom. A plurality of slots 24 encircle the center of plate 21 to receive the holding fingers 26 therein, the holding fingers being pivotally mounted on bolts 27 secured to downwardly depending ears 28 formed integrally with the base plate 11. Slots 24 enable the holding fingers to pivot inwardly and outwardly from the center of the holding device.

Figures 3, 4:
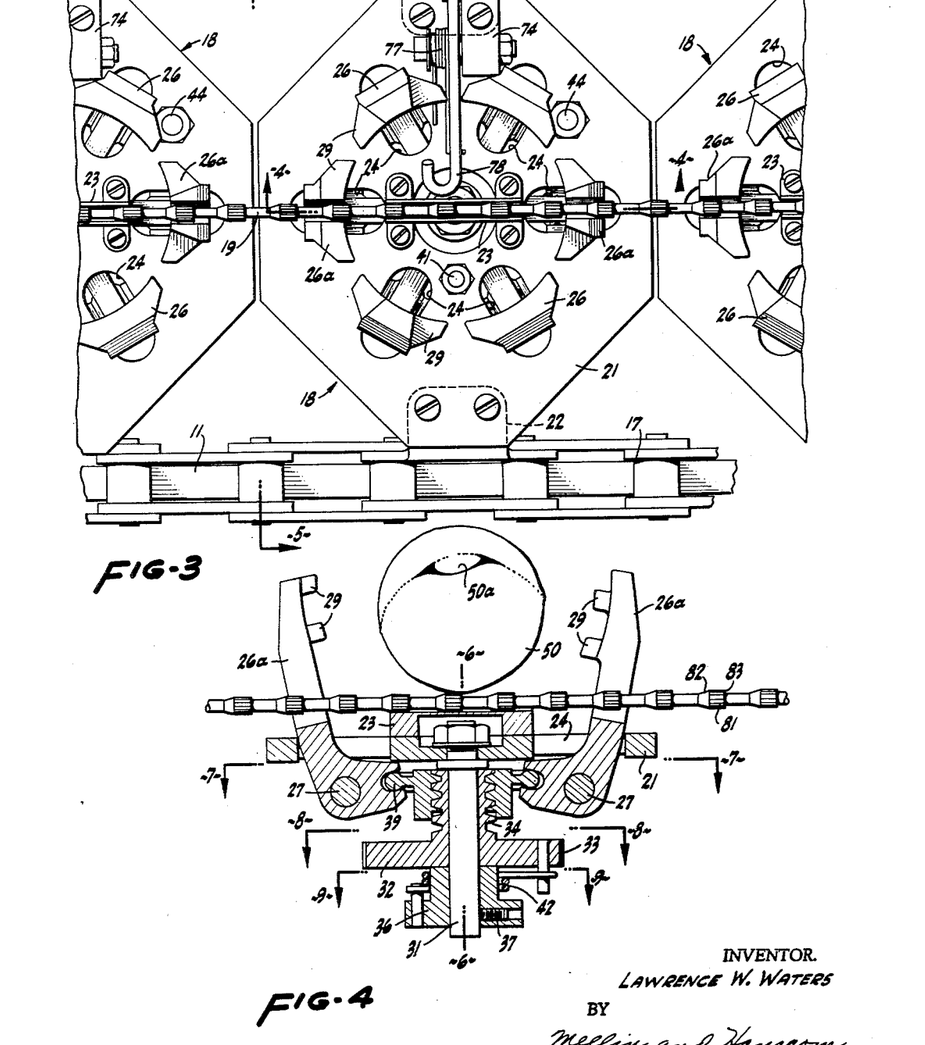
Fig. 3 is a plan view of one of the peach holding devices, as seen from the view line 3—3 of Fig. 1.
Fig. 4 is a longitudinal elevational section of a peach holding device, taken on the line 4—4 of Fig. 3.

Each holding finger 26 has outwardly extending projections 29 on the upper end thereof to provide for a large surface engagement of a peach held by the fingers, and, as will be noted in Fig. 3, the projections 29 form a circle to encircle a peach held thereby. As will be further noted, the centrally disposed holding fingers 26a have their upper ends bifurcated in order that as the holding device 18 is moved around sprocket 12, the bifurcated portions of fingers 26a will receive the orienting shaft 19 therebetween. In addition, the projections 29 on alternate fingers 26 are misaligned in order that the projections may be interdigitated to allow for full closing of the fingers.

Figure 6:
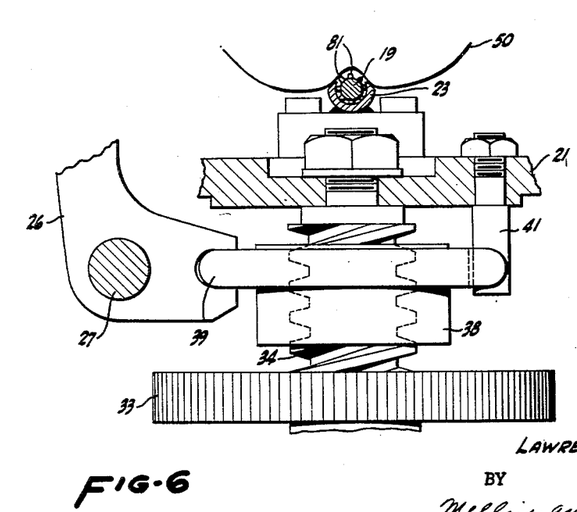
Fig. 6 is a sectional detail on an enlarged scale of a peach holding device and taken on the line 6—6 of Fig. 4.
Figure 7:
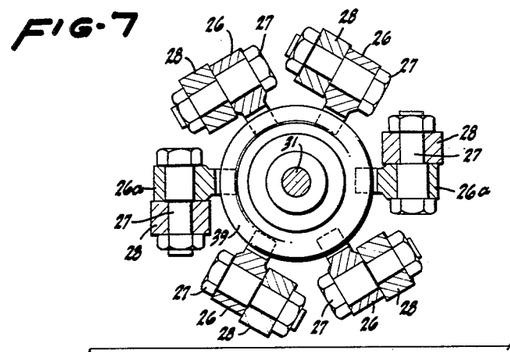
Fig. 7 is a horizontal sectional view taken on the line 7—7 of Fig. 4.

As seen in Figs. 4 and 6, a downwardly depending shaft 31 is fixed to base plate 21, with an integrally formed ratchet and screw member 32 rotatably mounted thereon. This latter member has a plurality of ratchet teeth 33 extending circumferentially therearound, and is also provided with threads 34 thereon. The member 32 is supported against vertical movement on shaft 31 by means of collar 36 secured to shaft 31 by setscrew 37. A flanged collar 38 is threaded onto threads 34, and is provided with an annular rounded flange 39 embraced by the lower slotted ends of the holding fingers 26. A downwardly depending stub 41, fixed to base plate 21, keys the flanged collar against rotation relative to the base plate while allowing vertical travel relative thereto. As is apparent, a rotation of the ratchet toothed element 32 will cause the flanged collar 38 to be threaded upwardly or downwardly on threads 34, with such movement causing the fingers 26 to open or close. A torsion spring 42, fixed at one end to collar 36 and at the other end thereof to the ratchet toothed element 32, urges the latter element to rotate in a direction to thread the flanged collar 38 downwardly and to move the holding fingers inwardly to closed position. A pawl 43, pivotally mounted on downwardly depending stub 44, is biased by spring 46 into engagement with ratchet teeth 33 to prevent closing rotation of the ratchet toothed element 32 by the above mentioned torsion spring 42.

As the holding devices 18 approach the beginning of the upper flight of the machine (i.e., the position indicated by A on Fig. 1), the holding fingers 26 are in full open position, being held in that position by the engagement of pawl 43 with the ratchet teeth 33, as above described. When the holding device 18 reaches position B, a peach 50 will be fed from the feeding station, herein represented by a feed chute 51, into the holding device.

The holding device will then be moved by the chain 17 towards position C. Shortly before it reaches this position, an upstanding pin 52, fixed relative to frame 11, abuts the pawl 43 to release the pawl from engagement with ratchet teeth (illustrated in Fig. 8). With the ratchet toothed member 32 released, the torsion spring 42 will close the fingers onto the peach 50, regardless of the size of the peach. This closed position is illustrated by position C of Fig. 1.

Figures 8, 9:
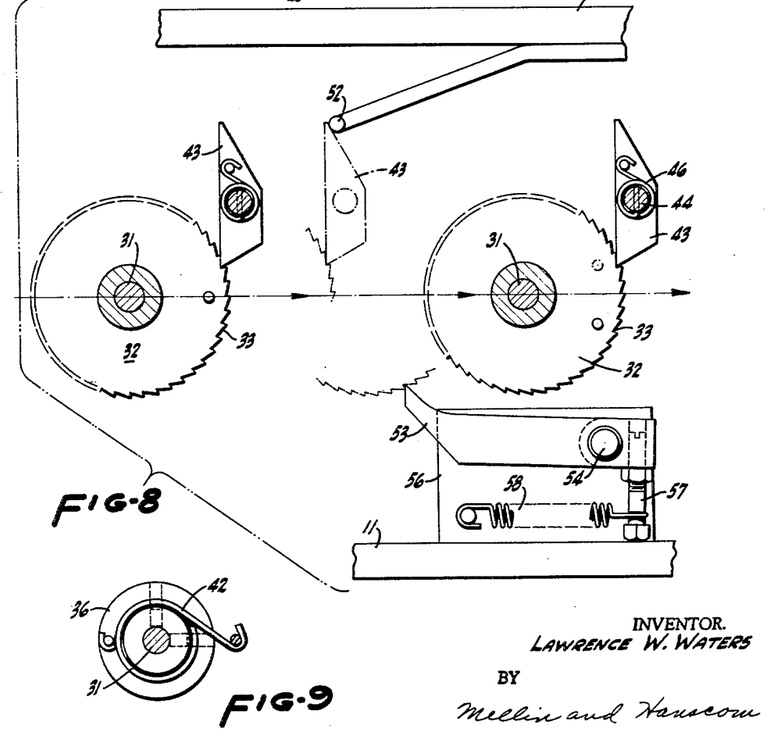
Fig. 8 is a sectional view of the machine taken on the line 8—8 of Fig. 4, and illustrates the gauging operation of the peach holding device.
Fig. 9 is a sectional detail taken on the line 9—9 of Fig. 4.

Further rightward movement of the peach holding device 18 causes the ratchet teeth 33 to move into engagement with prong 53, again as illustrated in Fig. 8. Prong 53 is pivotally mounted on stub 54 fixed to bracket 56 mounted on frame 11. An adjustment screw 57 is threaded into prong 53 so as to limit clockwise rotation of the prong induced by tension spring 58. Continued rightward movement of the holding device, and ratchet toothed member 32 carried therewith, causes the ratchet toothed member 32 to rotate in a clockwise direction until the ratchet toothed member 32 moves sufficiently far to the right to move out of engagement with prong 53. This rotation causes the holding fingers 26 to open, as previously described, with the amount of such opening being directly related to the angular rotation of member 32. Since the amount of angular rotation of member 32 is a function only of the setting of the adjustment screw 57, it will be seen that the opening movement will be the same for every holding device 18 regardless of how far the holding fingers 26 thereof had previously closed upon the particular peach held thereby. In this manner, the reopened fingers will have the same clearance from the peach held thereby in spite of variations in the sizes of the peaches.

The holding devices will be moved by chain 17 to the end of the upper flight; i.e., past the position indicated at P on Fig. 2. The pawl 43 again engages a pin 61 fixed relative to frame 11 (similar to pin 51) which moves the pawl 43 out of engagement with the ratchet toothed member 32, again allowing the holding fingers 26 to close and grip the peach 50, as illustrated at position Q.

The holding device 18 is then moved to position S, whereat the transfer mechanism, indicated generally at 100, clamps onto the peach to remove same. The holding fingers 26 are now opened to permit removal of the peach, in the following manner. A fixed fiber wheel 63 is mounted on lever 64, pivoted at 66 to the frame 11, and is biased by tension spring 67 into engagement with the ratchet toothed member 32, so that the fiber wheel 63 frictionally engages the ratchet teeth 33. Continued movement of the holding device will again cause the ratchet toothed member to rotate, as before, when prong 53 engaged the ratchet teeth, and the holding fingers will open sufficiently far to permit the peach held thereby to be removed.

Figure 5:
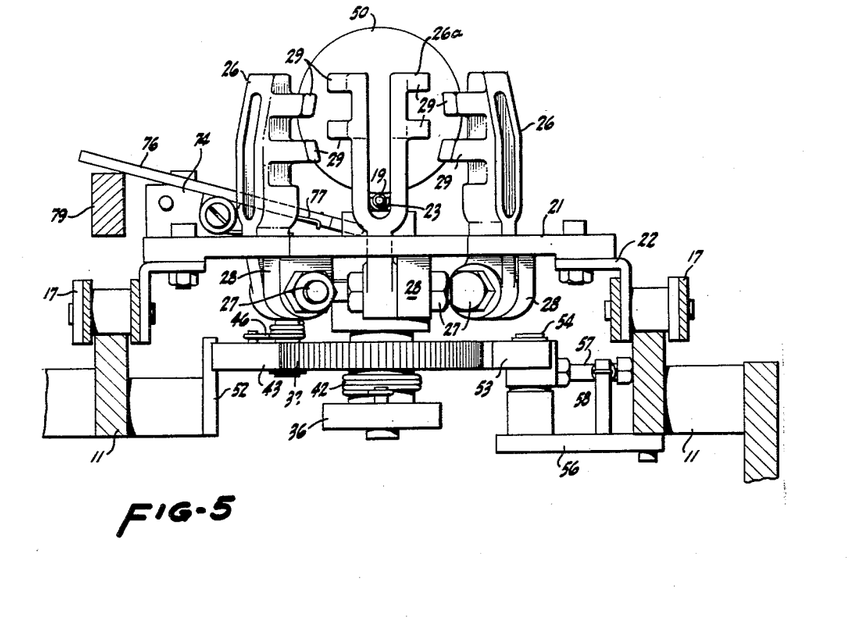
Fig. 5 is a transverse sectional view of the machine, taken on the line 5—5 of Fig. 3.
Figure 11:
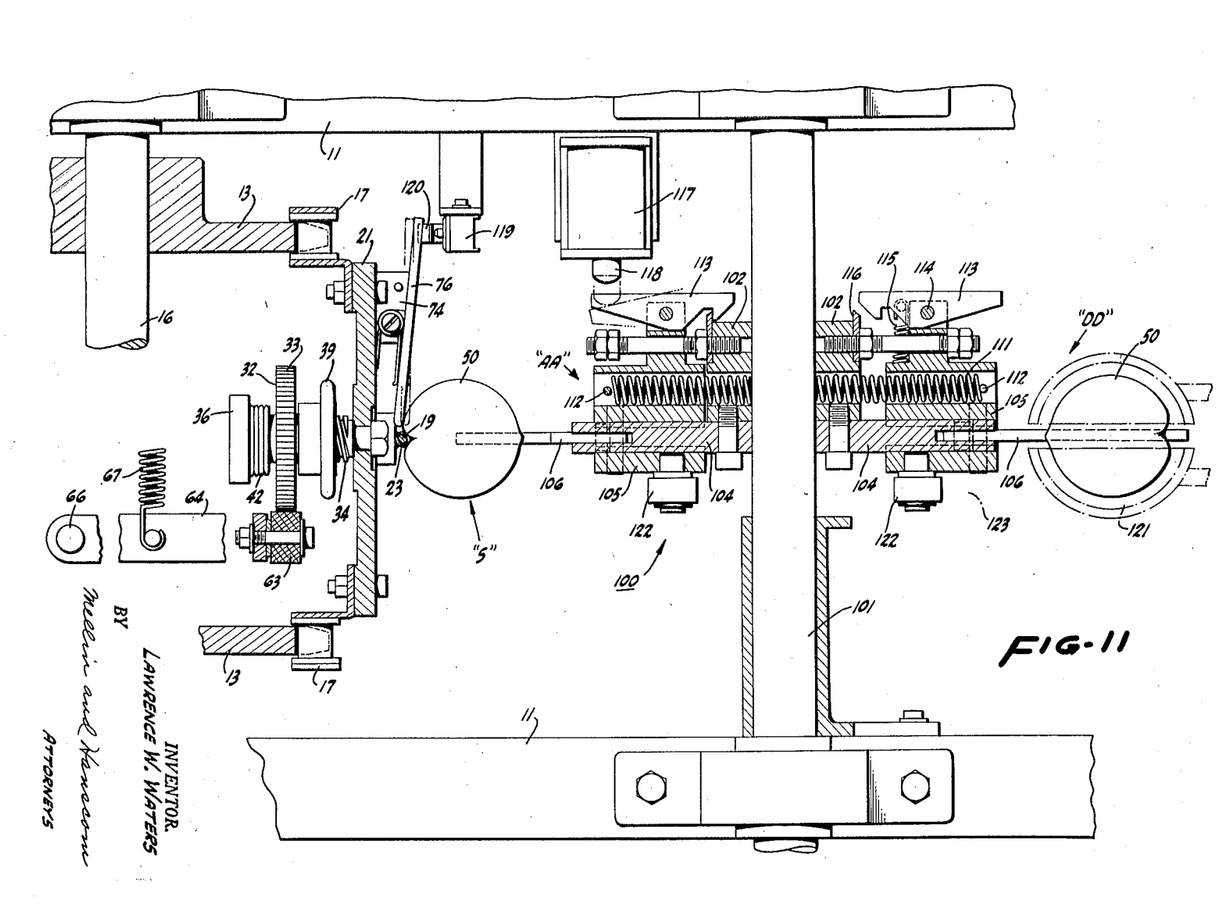

The holding device 18 will then move with chain 17 from the position T to the position Y, with the fingers 26 partially opened. As the holding device travels leftwardly from this last position, the ratchet toothed member 32 will come into engagement with the ratchet wheel 68 (Fig. 13) fixed against rotation to lever 69, this lever being pivotally mounted on stub 71 fixed relative to frame 11. Tension spring 72 biases the lever 69 to rotate in a clockwise direction, until adjustment screw 73 bears against frame 11. Continued movement of the holding device 18 to the left causes the ratchet toothed member 32 to rotate and open the holding fingers to their full open position, indicated at positions Y and around to A. Each holding device 18 is also provided with a switch actuator which is responsive to orientation of a peach in the device. A support block 74 is fixed to the base plate 21 and carries a switch actuating rod 76 pivotally mounted thereon, such rod being biased to move in a counterclockwise direction, as seen in Fig. 5, by torsion spring 77. The actuating rod 76 has a U-shaped end portion 78, positioned adjacent the orienting shaft 19, adapted to move under the influence of spring 77 into engagement with the lower surface of a peach held in the holding device. As the holding device 18 moves along the upper flight of the conveyor chain 17, the actuating rod 76 slides along cam rail 79, fixed to frame 11, which holds the rod 76 in the clockwise moved position illustrated in Fig. 5. The actuating rod will slide off of rail 79 after the holding device leaves the position indicated at Q, at which time the peach has been regripped by the holding fingers 26. Referring now to Fig. 11, if the peach has been oriented, it will be in the position shown in solid lines, with the dimpled stem end of the peach resting on the open topped channel 23, such that the actuating rod 76 will be moved by spring 77 into the solid line position thereof, where it engages and is restrained from further movement by the peach. If, however, the peach had not been oriented, it would be in the dotted line position of Fig. 11, and the actuating rod 76 would have moved to the dotted line position thereof before it engages the peach.

*The orienting mechanism*

The orienting shaft 19 has a plurality of longitudinally spaced groups of radially enlarged ribs 81, the ribs being spaced circumferentially of the shaft, as shown in Fig. 6. As shown in Fig. 4, the ribs 81 taper downwardly at 82 to the left, to shaft 19, while the right ends 83 of the ribs form an abrupt shoulder with the shaft. Thus, when the shaft 19 moves to the right, the abrupt shoulder 83 will catch the lower surface of the peach and rotate the peach about an axis transverse to the machine. As the shaft 19 moves to the left, the tapered surface 82 of the ribs will slide under the peach without imparting much, if any, rotational movement thereto. Consequently, the peach will rotate in essentially one direction about its transverse axis. At the same time, a uni-directional rotation of the shaft 19 will impart a unidirectional rotation to the peach about an axis parallel to shaft 19, due to the frictional engagement of the ribs 81 with the peach.

It is a characteristic of a peach that the stem end depression is elongated, with the elongation being in the suture plane of the peach, as illustrated at 50a in Fig. 4, and the open topped channel 23 is designed so that when the stem end is down and the stem end depression 50a is in alignment with the channel, then the peach will rest solely on the upper edges of the channel, and the orienting shaft 19 protruding upwardly from the channel will not engage the surface of the peach, as illustrated in Fig. 6. For any other position of the peach, the orienting shaft will engage its surface to impart rotation thereto.

Thus, when an unoriented peach has been put into the holding device and the holding fingers 26 have been reopened to allow free rotation of the peach, the orienting shaft 19 will frictionally engage the surface of the peach, and the combined rotational and reciprocatory movement of the shaft will cause the peach to rotate in the two directions described above, until the elongated stem end depression 50a seats on the upper edges of the channel 23 in alignment therewith, at which time no further rotation is transmitted from the orienting shaft to the peach.

The orienting shaft 19 is rotated and reciprocated in the following manner. A drive housing 85 is mounted on frame 11 and supports motor 86 in driving engagement, through V-belts 87 and 88, with shafts 89 and 90. A drive coupling member 91, fixed to orienting shaft 19, has a splined connection (not shown) to drive shaft 89 to allow the orienting shaft to move axially with respect to the drive shaft 89, while retaining full rotational engagement therewith.

An oscillating lever 92 is pivotally mounted at 93 to the drive housing 85 and has a first depending lug 94 thereon engaged in the track of barrel cam 95 mounted on drive shaft 90, and a second depending lug 96 engaged between the annular flanges 97 on drive coupling member 91. Thus, as the shaft 90 and barrel cam 95 rotate, the lever 92 will be caused to oscillate with this movement being transmitted to the drive coupling member 91 to move the orienting shaft back and forth in an aixal direction. At the same time, the rotation of drive shaft 89 is transmitted to the orienting shaft 19.

It has been found that with a single direction of rotation of the orienting shaft, some peaches have a tendency to hang up on some small protuberance other than the stem section and fail to become oriented. This problem has been substantially alleviated by rotating the orienting shaft in one direction for a desired period of time, and then reversing the rotation for a similar period, as the holding devices travel the length of the machine. To obtain this desired shaft rotation reversal, a conventional, continuously cycling, reversing switch 98 is connected in the power line 99 to the motor 86 (Fig. 1). The switch control 98a may be adjusted to vary the length of time between switch reversals, as desired. It is to be understood that any other conventional manner of periodically reversing the rotation of the orienting shaft may be employed for this purpose, if desired.

*The transfer mechanism*

The transfer mechanism 100, previously referred to, operates in timed relationship to the movement of the endless chain 17, to remove the oriented peaches from the peach holding devices and to transfer the oriented peaches to the feed cups of a pitting machine.

Figure 10:
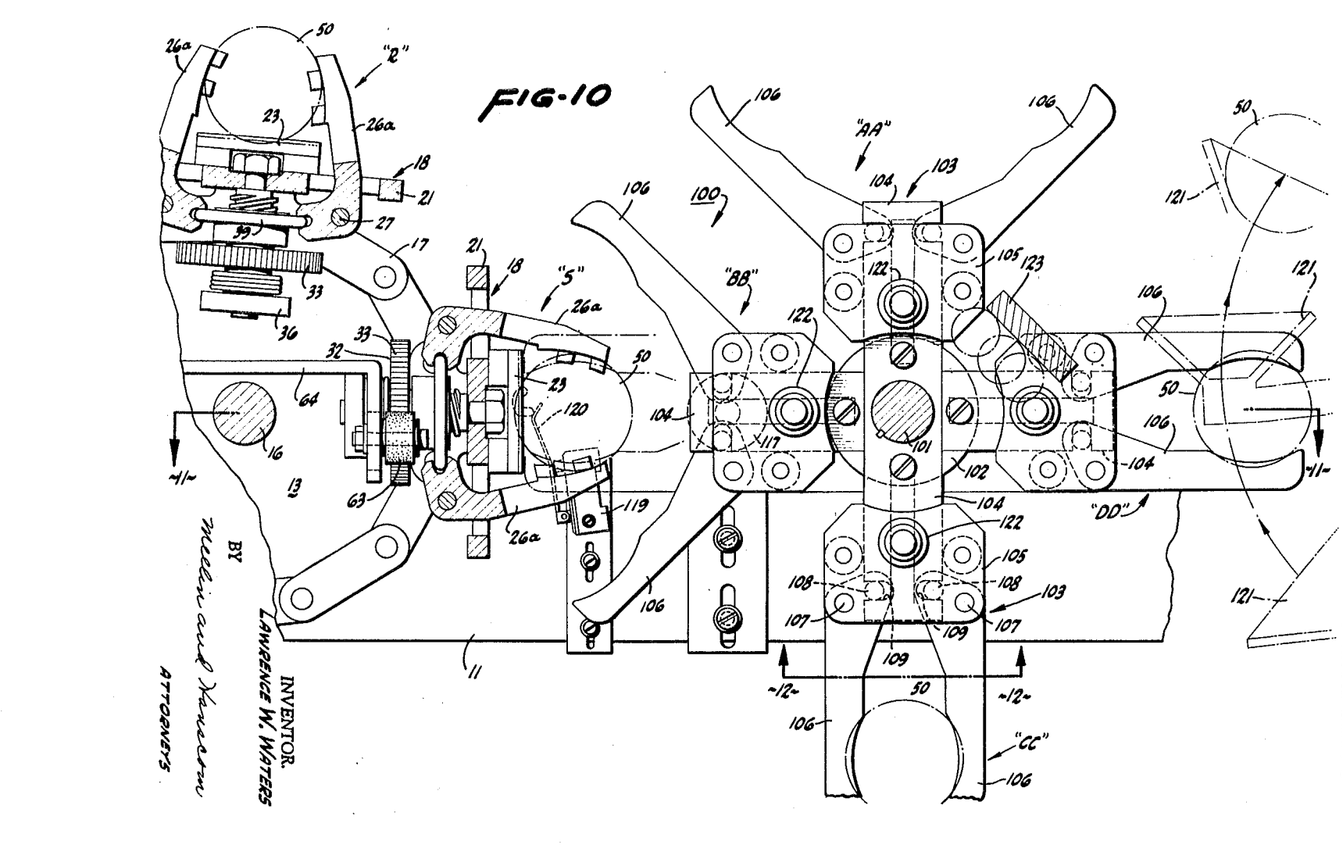
Fig. 10 is a longitudinal sectional view of the back end of the machine, illustrating the mechanism for removing the oriented peaches from the machine, and with parts shown in elevation.
Figures 12, 13, 14:
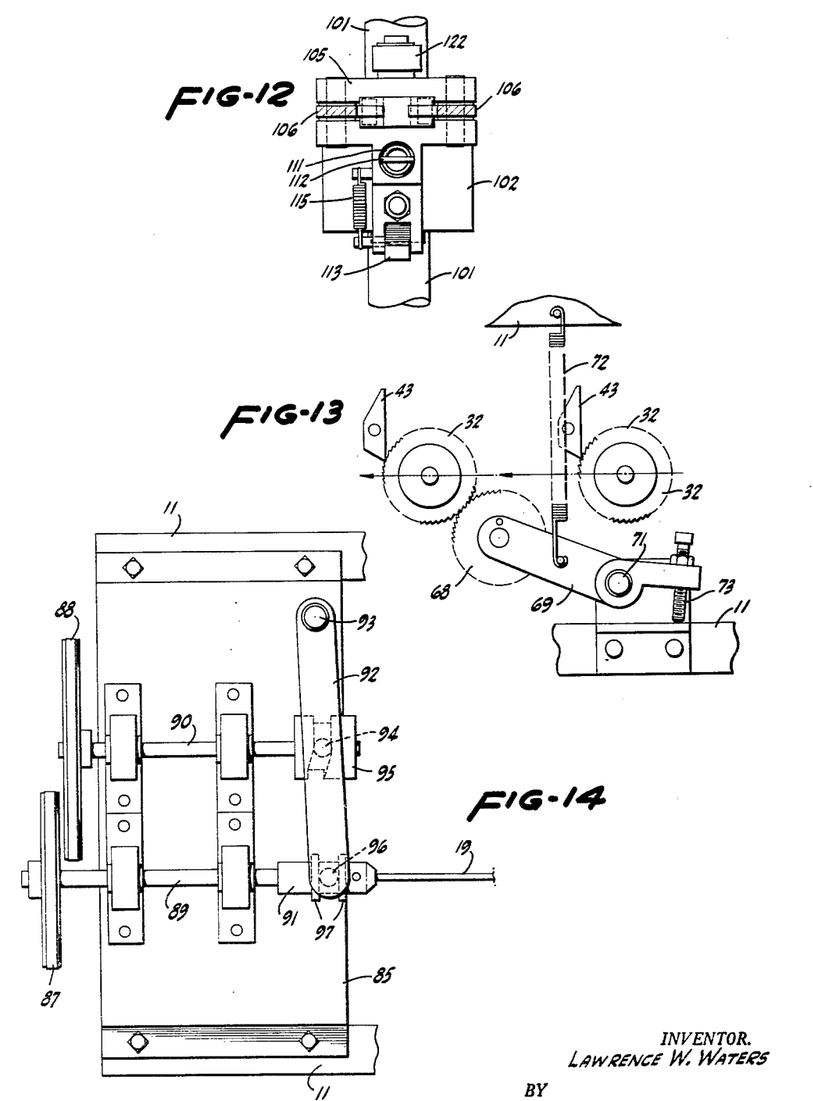
Fig. 12 is a sectional detail of the peach removing means, taken on the line 12—12 of Fig. 10.
Fig. 13 is a sectional view illustrating the mechanism to open the peach holding fingers and is taken on the line 13—13 of Fig. 1.
Fig. 14 illustrates the drive means for the peach orienting rod, as seen from view line 14—14 of Fig. 1.

Referring now to Figs. 10, 11 and 12, a transversely disposed shaft 101 is rotatably journaled in frame 11, and carries a collar 102 fixed thereon intermediate its ends, to support the four peach gripping devices 103. As each of the gripping devices 103 is identical, it will suffice to describe the device illustrated as in position CC of Fig. 10.

A radially projecting arm 104 is fixed to collar 102 and has a yoke 105 slidably mounted thereon for radial movement relative to the collar. Two gripping arms 106 are each pivotally mounted to the yoke 105 at 107, and each has a stub member 108 disposed within a notch 109 in arm 104. As is evident from Fig. 10, outward movement of a yoke 105 on its arm 104 will cause the gripping arms 106 to close (as shown in solid lines in position CC and DD), while inward movement of a yoke 105 on its arm 104 will cause the gripping arms to pivot to open position (as shown in positions AA and BB).

A compression spring 111 confined between shaft 101 and pin 112 on yoke 105 normally urges the yoke 105 outwards, so as to normally close the gripping arms 106. A spring-biased latch lever 113, pivotally mounted at 114 on yoke 104 and biased by spring 115 is adapted to engage a latch plate 116 mounted on collar 102 to retain yoke 105 in an inward position against the bias of spring 111.

A solenoid 117 is mounted on frame 11, and is provided with a plunger 118 adapted to engage the latch lever 113 of the gripping device 103 when the latter is in position BB, and when the solenoid is energized. A microswitch 119 is also mounted on frame 11, and is provided with a switch arm 120 positioned to be engaged by an actuating arm 76 of the holding devices 18, when the actuating arm is in the solid line position of Fig. 11 (i.e., when a peach is in oriented position). Circuit means (not shown) connect the solenoid through the microswitch to a source of power, such that when the microswitch is actuated, the solenoid will be energized. Thus, if a peach 50 is oriented when the holding device moves into position S, the actuating rod 76 will be in the solid line position of Fig. 11 to engage and actuate the switch arm 120 of the microswitch, in turn energizing the solenoid 117 and causing the plunger 118 thereof to move the latch lever 113 to its dotted line position, freeing the yoke 105 for outward movement to close the gripping arms 106 upon the peach.

If the peach is not properly oriented, the switch actuator 76 will be in the dotted line position of Fig. 11, and will not engage the switch arm of the microswitch, and the gripping arms 106 will remain latched open. Further movement of the holding device 18 will then dump the unoriented peach onto the floor beneath the machine as the holding fingers open.

Assuming, however, that a peach has been gripped by the gripping arms 106, rotation of shaft 101 will strip the oriented peach from the holding fingers of the holding device 18, and the gripping device will move around to the position CC, at which time the feed cup 121 of the pitting machine will come up underneath the gripped peach, and the peach will then be held both by the feed cup 121 and the gripping arms 106. Continued rotation of the gripping device will cause the roller 122 mounted thereon to engage a cam plate 123, fixed to frame 11, and will force the yoke 105 inwardly to the latched position, thereby opening the arms 106 so that the feed cup 121 may move the peach to a pitting blade. An example of a pitting machine which may be used wtih the present invention is shown and described in my copending application, Serial No. 641,713, filed February 21, 1957, and entitled Method and Apparatus for Pitting Peaches.

*The drive mechanism*

The endless chain 17 and the transfer mechanism 62 are driven intermittently in timed synchronization to the pitting machine with which they are utilized.

Referring now to Fig. 2, a drive chain 150 is adapted to be continuously driven from the continuously rotating drive shaft of the pitting machine (not shown), and thus continuously drives the sprocket 151 rotatably journaled on frame 11.

As sprocket 151 rotates, the roller 152 carried thereby rides in and out of the radial slots 153 formed on the face of wheel 154 which is keyed to shaft 101, in a Geneva-type drive. As shown in Fig. 2, counterclockwise rotation of sprocket 151 will carry the roller 152 around until it starts to enter the radial slot 153a, with no rotation of wheel 154. Continued rotation of sprocket 151 will carry the roller into slot 153a and will then drive the wheel 154 around to the position of slot 153b, at which time the roller 152 will again ride out of the slot to engage the next slot (now 153c). Thus, each complete revolution of sprocket 151 will intermittently advance wheel 154 and shaft 101 through a quarter revolution.

A sprocket 156 is also fixed for rotation with shaft 101, and intermittently drives endless drive chain 157 which is trained around sprocket 158, fixedly mounted on shaft 16, and also around idler sprocket 159, rotatably journaled on frame 11.

The intermittent drive described above has been found to provide additional motion to the peaches during the orienting, which thus increases the percentage of orientation of the peaches. However, a continuous drive may be imparted to the transfer device 62 and to the endless chain 17, if desired.

In orienters of this type, it is obvious that the percentage of peaches successfully oriented during operation of the machine will be determined primarily by the length of time that the peaches are permitted to rotate in the holding devices 18 until they straddle the orienting shaft in an oriented position. If the peaches are allowed to rotate for only a relatively short time, then only a relatively small percentage of the peaches will come to rest in an oriented position, whereas if they are allowed to rotate for a longer time, then a greater percentage of the peaches will come into an oriented position. Since the orienting machine described herein is designed to feed peaches to an automatic pitting machine, the speed of the endless chain 17 must necessarily be such as to supply one peach to the pitting machine feed cup for each cycle of operation of the pitting machine. Thus, the amount of time in which an individual peach may be oriented will depend on the overall length of the orienting device, which is governed primarily by the available floor space at the plant.

It is a feature of the present invention that the overall length of the orienting device is easily varied, to meet different plant layouts, by simply adding or subtracting lengths of the orienting shaft 19 and by increasing or decreasing the length of the endless chain 17, to obtain the desired overall length of the device, since there are no mechanical requirements that the left-hand end of the machine (Fig. 1) be spaced any particular distance from the right-hand end of the machine (Fig. 2).

It is to be understood that the form of the invention herewith shown and described is to be taken as a preferred embodiment of the same, and that various changes in the shape, size and arrangement of parts may be resorted to without departing from the spirit of the invention of the scope of the attached claims.

Having thus described my invention, what I claim and desire to secure by Letters Patent is:

1. In a peach orienting machine, a peach holding device having a plurality of fingers adapted to encircle and hold a peach, means to close said fingers onto a peach held by said device, means to open said fingers a predetermined distance from said peach, and a rotating and reciprocating shaft carried by said holding device and adapted to frictionally engage the bottom of a peach held by said fingers.

2. A peach orienting machine comprising an endless chain, a peach holding device mounted on said chain for movement therewith, said holding device having a plurality of holding fingers adapted to encircle a peach, means to open said fingers, means to feed a peach into said holding device, means to close said fingers onto said peach, means to reopen said fingers a predetermined distance from said peach, and a rotating and reciprocating shaft carried by said holding device and frictionally engageable with the bottom of said peach to orient said peach while said fingers are spaced said predetermined distance from said peach.

3. A peach orienting machine comprising an endless chain, drive means to advance said chain, a peach holding device mounted on said chain for movement therewith, said holding device having a plurality of holding fingers adapted to encircle a peach, means to open said fingers, means to feed a peach into said holding device, means to close said fingers onto said peach, means to reopen said fingers a predetermined distance from said peach, and a rotating and reciprocating shaft carried by said holding device and frictionally engageable with the bottom of said peach to orient said peach while said fingers are spaced said predetermined distance from said peach.

4. A peach orienting machine comprising an endless chain, a peach holding device mounted on said chain for movement therewith, said holding device having a plurality of holding fingers adapted to encircle a peach, means to open said fingers, means to feed a peach into said holding device, means to close said fingers onto said peach, means to reopen said fingers a predetermined distance from said peach, a rotating and reciprocating shaft carried by said holding device and frictionally engageable with the bottom of said peach to orient said peach while said fingers are spaced said predetermined distance from said peach, means to close said fingers onto said peach after the orientation thereof, transfer means to grip said peach while the peach is held by said closed fingers, and means to open said fingers after said transfer means has gripped said peach whereby said peach may be removed from said holding device.

5. In a machine as set forth in claim 4 further including a sensing means carried by said holding device and responsive to orientation of said peach for actuating said transfer means if said peach is oriented.

6. A peach orienting machine comprising an endless chain, drive means to intermittently advance said chain, a peach holding device mounted on said chain for movement therewith, said holding device having a plurality of holding fingers adapted to encircle a peach, means to open said fingers, means to feed a peach into said holding device, means to close said fingers onto said peach, means to reopen said fingers a predetermined distance from said peach, a rotating and reciprocating shaft carried by said holding device and frictionally engageable with the bottoms of said peach to orient said peach while said fingers are spaced said predetermined distance from said peach, means to close said fingers onto said peach after the orientation thereof, transfer means to grip said peach while the peach is held by said closed fingers, and means to open said fingers after said transfer means has gripped said peach whereby said peach may be removed from said holding device.

7. A peach orienting machine comprising an endless chain, a shaft extending axially along the upper flight of said chain, said shaft having a frictional surface, means to rotate said shaft, a peach holding device carried by said chain and having an open topped channel member adapted to receive said shaft therein, a plurality of peach holding fingers mounted on said holding device to hold a peach vertically above and in engagement with said shaft, a peach feeding station adjacent said endless chain to feed a peach into said holding device, means to open said fingers before said holding device passes said feeding station, means to close said fingers onto a peach after said holding device has passed the feeding station, and means to reopen said fingers a predetermined distance from said closed position to allow said shaft to orient said peach.

8. A peach orienting machine comprising an endless chain, drive means to intermittently advance said chain, a shaft extending axially along the upper flight of said chain, said shaft having a frictional surface and being periodically reduced in diameter along the length thereof to form a plurality of shoulders thereon, means to rotate and to reciprocate said shaft, a peach holding device carried by said chain and having an open topped channel member adapted to receive said shaft therein, a plurality of peach holding fingers mounted on said holding device to hold a peach vertically above and in engagement with said shaft, a peach feeding station adjacent said endless chain to feed a peach into said holding device, means to open said fingers before said holding device passes said feeding station, means to close said fingers onto a peach after said holding device has passed the feeding station, and means to reopen said fingers a predetermined distance from said closed position whereby said shaft may orient said peach.

9. A peach orienting machine comprising an endless chain, a shaft extending axially along the upper flight of said chain, said shaft having a frictional surface and a plurality of radial shoulders thereon, means to rotate and to reciprocate said shaft, a peach holding device carried by said chain and having an open topped channel member adapted to receive said shaft therein, a plurality of peach holding fingers mounted on said holding device to hold a peach vertically above and in engagement with said shaft, a peach feeding station adjacent said endless chain to feed a peach into said holding device, means to open said fingers before said holding device passes said feeding station, means to close said fingers onto a peach after said holding device has passed the feeding station, and means to reopen said fingers a predetermined distance from said closed position whereby said shaft may orient said peach.

10. A peach orienting machine comprising an endless chain, a shaft extending axially along the upper flight of said chain, said shaft having a frictional surface, means to rotate said shaft, a peach holding device carried by said chain and having an open topped channel member adapted to receive said shaft therein, a plurality of peach holding fingers mounted on said holding device to hold a peach vertically above and in engagement with said shaft, a peach feeding station adjacent said endless chain to feed a peach into said holding device, means to open said fingers before said holding device passes said feeding station, means to close said fingers onto a peach after said holding device has passed the feeding station, means to reopen said fingers a predetermined distance from said closed position whereby said shaft may orient said peach, means to reclose said fingers onto said peach after the orientation thereof, transfer means to grip said peach while said peach is held by said reclosed fingers, and means to reopen said fingers after said transfer means has gripped said peach whereby said peach may be removed from said holding device.

11. A peach orienting machine comprising an endless chain, a shaft extending axially along the upper flight of said chain, said shaft having a frictional surface and a plurality of radial shoulders thereon, means to rotate and to reciprocate said shaft, a peach holding device carried by said chain and having an open topped channel member adapted to receive said shaft therein, a plurality of peach holding fingers mounted on said holding device to hold a peach vertically above and in engagement with said shaft, a peach feeding station adjacent said endless chain to feed a peach into said holding device, means to open said fingers before said holding device passes said feeding station, means to close said fingers onto a peach after said holding device has passed the feeding station, means to reopen said fingers a predetermined distance from said closed position whereby said shaft may orient said peach, means to reclose said fingers onto said peach after the orientation thereof, transfer means to grip said peach while said peach is held by said reclosed fingers, and means to reopen said fingers after said transfer means has gripped said peach whereby said peach may be removed from said holding device.

12. In a peach orienting machine, a peach holding device comprising a horizontally disposed base plate, an open topped channel member centrally disposed on said base plate, a plurality of upstanding holding fingers disposed around said channel member and pivoted to said base plate for opening and closing movement relative to the vertical axis of said holding device, a switch actuating rod pivotally mounted on said base plate and having an end disposed adjacent said channel member, and spring means biasing said rod end upwardly above the top of said channel member.

13. In a peach orienting machine, a peach holding device comprising a horizontally disposed base plate, an open topped channel member centrally disposed on said base plate, a plurality of upstanding holding fingers disposed around said channel member and pivoted to said base plate for opening and closing movement relative to the vertical axis of said holding device, a ratchet-toothed member rotatably mounted on said base plate and having ratchet teeth circumferentially therearound, means responsive to rotation of said ratchet-toothed member for opening and closing said fingers, resilient means biasing said ratchet-toothed member for rotation in a direction to close said fingers, and a spring-biased pawl carried by said holding device in normal engagement with said ratchet teeth to restrain rotation thereof by said resilient means.

14. A peach orienting machine comprising: a frame; a peach holding device mounted for movement along said frame, said holding device comprising a horizontal base plate, a plurality of upstanding holding fingers disposed around the center of said base plate and pivoted to said base plate for opening and closing movement relative to the vertical axis of said holding device, a rotatable member mounted on said base plate and having ratchet teeth circumferentially therearound, means responsive to rotation of said rotatable member for opening and closing said fingers, resilient means biasing said rotatable member for rotation in a direction to close said fingers, a pawl carried by said holding device in normal engagement with said ratchet teeth to restrain rotation of the rotatable member by said resilient means; a stub fixed to said frame in the path of movement of said holding device, said stub being engageable with said pawl to release said pawl from engagement with said ratchet teeth as said holding means moves past said stub, whereby said rotatable member is free to rotate by said resilient means to close said fingers; and opening means carried by said frame in the path of movement of said holding device after it passes said stub, said opening means being engageable with said ratchet teeth to rotate said rotatable member a predetermined amount in a direction to open said fingers as said holding device moves past said opening means, whereby said fingers are opened a predetermined amount from their closed position.

15. A peach orienting machine comprising: a frame; a peach holding device mounted for movement along said frame, said holding device comprising a horizontally disposed base plate, an open topped channel member centrally disposed on said base plate, a plurality of upstanding holding fingers disposed around said channel member and pivoted to said base plate for opening and closing movement relative to the vertical axis of said holding device, a ratchet-toothed member rotatably mounted on said base plate and having ratchet teeth circumferentially therearound, means responsive to rotation of said ratchet-toothed member for opening and closing said fingers, resilient means biasing said ratchet-toothed member for rotation in a direction to close said fingers, a spring-biased pawl carried by said holding device in normal engagement with said ratchet teeth to restrain rotation thereof by said resilient means; a stub fixed to said frame in the path of movement of said holding device after it leaves said feeding means, said stub being engageable with said pawl to release said pawl from engagement with said ratchet teeth as said holding means moves past said stub, whereby said ratchet-toothed member is free to rotate by said resilient means to close said fingers; opening means carried by said frame in the path of movement of said holding device after it passes said stub, said opening means being engageable with said ratchet teeth to rotate said ratchet-toothed member a predetermined amount in a direction to open said fingers as said holding device moves past said opening means, whereby said fingers are opened a predetermined amount from their closed position; and means to vary the point of engagement between said opening means and said ratchet-toothed member whereby the amount of rotation of said ratchet-toothed member may be varied.

16. A peach orienting machine comprising: a frame; a peach holding device mounted for movement along said frame, said holding device comprising a base plate, an open topped channel member centrally disposed on said base plate, a plurality of upstanding holding fingers disposed around said channel member and pivoted to said base plate for opening and closing movement relative to the vertical axis of said holding device, a ratchet-toothed member rotatably mounted on said base plate and having ratchet teeth circumferentially therearound, means responsive to rotation of said ratchet-toothed member for opening and closing said fingers, resilient means biasing said ratchet-toothed member for rotation in a direction to close said fingers, a spring-biased pawl carried by said holding device in normal engagement with said ratchet teeth to restrain rotation thereof by said resilient means, feeding means operatively associated with said machine for feeding a peach into said holding device when said fingers are in open position; a stub fixed to said frame in the path of movement of said holding device after it leaves said feeding means, said stub being engageable with said pawl to release said pawl from engagement with said ratchet teeth as said holding means moves past said stub, whereby said ratchet-toothed member is free to rotate by said resilient means to close said fingers; opening means carried by said frame in the path of movement of said holding device after it passes said stub, said opening means being engageable with said ratchet teeth to rotate said ratchet-toothed member a predetermined amount in a direction to open said fingers as said holding device moves past said opening means, whereby said fingers are opened a predetermined amount from their closed position; means to vary the point of engagement between said opening means and said ratchet-toothed member whereby the amount of rotation of said ratchet-toothed member may be varied; a switch actuating rod pivotally mounted on said base plate and having a first end disposed adjacent said channel member, spring means biasing said rod end upwardly above the top of said channel member; and cam means on said frame engaging the other end of said actuating rod to move said first end thereof below the top of said channel member.

17. A peach orienting machine comprising an endless chain, drive means to advance said chain, a peach holding device mounted on said chain for movement therewith, said holding device having a plurality of holding fingers adapted to encircle a peach, means to open said fingers, means to feed a peach into said holding device, means to close said fingers onto said peach, means to reopen said fingers a predetermined distance from said peach, an orienting shaft frictionally engageable with the bottom of said peach while said fingers are spaced said predetermined distance from said peach, means to rotate and reciprocate said shaft, and means to periodically reverse the direction of rotation of said shaft.

18. A peach orienting machine including means for conveying peaches from a receiving station to a delivery station and orienting means comprising a longitudinal shaft member having its axis parallel to the path of travel of the fruit between said stations, said shaft having a frictional surface and being periodically reduced in diameter along the length thereof to form a plurality of shoulders thereon, and means to rotate and reciprocate said shaft, (References on following page)

References Cited in the file of this patent

UNITED STATES PATENTS

| | | |
|---|---|---|
| 2,212,892 | Ashlock | Aug. 27, 1940 |
| 2,540,020 | Waters | Jan. 30, 1951 |
| 2,742,137 | Carroll | Apr. 17, 1956 |
| 2,769,521 | Hait | Nov. 6, 1956 |
| 2,788,818 | Skog | Apr. 16, 1957 |

FOREIGN PATENTS

| | | |
|---|---|---|
| 146,178 | Australia | Apr. 23, 1952 |